Patented Sept. 7, 1937

2,092,352

UNITED STATES PATENT OFFICE 2,092,352

QUINOLINE DERIVATIVES

Heinrich Jensch, Frankfort-on-the-Main, Germany, assignor to Winthrop Chemical Company, Inc., New York, N. Y., a corporation of New York No Drawing. Original application January 23, 1933, Serial No. 653,192. Divided and this application February 24, 1936, Serial No. 65,539. In Germany January 26, 1932

5 Claims. (Cl. 260—27)

The present invention relates to quinoline derivatives.

I have found that diaminoquinolines which contain one primary or secondary amino group in the benzene nucleus and the other in the 2- or 4-position and in which the amino group contained in the benzene nucleus has as a substituent a cyanuric acid radical are of a particular importance as valuable substances for the disinfection of the tissue and for combating protozoa diseases. The new compounds may be obtained by introducing in the usual manner a primary or secondary amino group with the aid of the corresponding halogen-, alkoxy-, hydrazino-, carbamino- or carbazido-derivatives into the 2- or 4-position of quinolines containing in the benzene nucleus an amino- or an alkylamino-group which is substituted by a cyanuric acid radical. They are also obtainable by introducing a cyanuric acid radical into the amino group of the benzene nucleus of the above mentioned diaminoquinolines, in which case the amino group contained in the heterocyclic nucleus is not affected.

The new compounds have the following general formula:

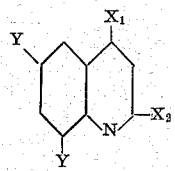

wherein $X_1$ stands for an amino or alkylamino group or for hydrogen, $X_2$ stands for an amino or alkylamino group, methyl or hydrogen, at least one X being amino or alkylamino and Y stands for the group

$Z_1$ being a cyanuric acid radical, $Z_2$ being hydrogen or alkyl and the other Y stands for hydrogen.

As is known, the three acid groups of cyanuric acid are capable of reacting one after the other. It is, therefore, possible to introduce also other groups, such as hydroxyl, alkoxyl, primary, secondary or tertiary amino groups or the like, besides an aminoquinolylamine radical into the cyanuric ring. It is advisable to start from cyanuric chloride and to substitute therein for the chlorine atoms completely or partially in any desired selection and succession the afore-mentioned radicals in any case, however, for at least one chlorine atom there is substituted an aminoquinolylamine radical.

The following examples serve to illustrate the invention, but they are not intended to limit it thereto:

(1) (2-methyl-4-aminoquinolyl-6)-dichlor-cyanuramide 10.5 grams of 4.6-diaminoquinaldine in form of the base as obtained according to Example 1 of the parent application Serial No. 653,192, filed January 23, 1933 are dissolved in 60 cc. of glacial acetic acid and the solution is gradually poured at a temperature of between 10° C. and 15° C., while stirring, into a solution of 12 grams of cyanuric chloride in 100 cc. of glacial acetic acid. During this process the hydrochloride of (2-methyl-4-aminoquinolyl-6)-dichlorcyanuramide is formed in form of a colorless precipitate which is filtered by suction and washed with glacial acetic acid and ether: the yield amounts to 20 grams. The compound does not alter when heated to 300° C. except that it becomes faintly red. Above 100° C. acetic acid is split off. The compound is readily soluble in water. The base is precipitated from this solution in form of a jelly by means of sodium carbonate.

The same compound can also be obtained in form of the hydrochloride by adding 1 mol. of diaminoquinaldine dissolved in acetone at about 0° C. to the ethereal solution of 1 mol. of cyanuric chloride. The yield nearly corresponds with the theory. The compound has the following formula:

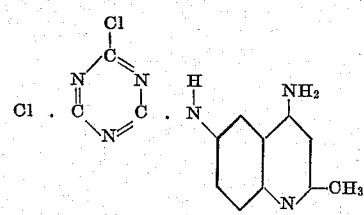

(2) 2-methyl-4-aminoquinolyl-6-melamine 10 grams of the hydrochloride of (2-methyl-4- amino-quinolyl-6) - dichlorcyanuramide of the preceding example are heated for 3 hours to a temperature of between 120° C. and 125° C. together with 50 cc. of alcoholic ammonia. The contents of the tube are then evaporated to dryness. The residue obviously constituting a hydrochloride of the 2-methyl-4-aminoquinolyl-6-melamine is extracted with water and the hot extract is mixed with about the same volume of a saturated solution of sodium chloride. On cooling, the hydrochloride is separated, filtered by suction and washed with a small quantity of aqueous acetone and then with pure acetone. The yield amounts to 6 grams. The salt is readily soluble in water to a neutral reaction. It is likewise readily soluble in 2 normal hydrochloric acid, leaving a smeary residue. The colorless base is precipitated by means of caustic soda solution and after recrystallization from water and ethanol is obtained in form of a fine powder. The base darkens and melts at 267° C. and has the following formula:

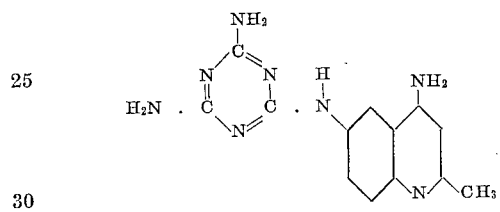

(3) 3.5 grams of 4.6-diaminoquinaldine are dissolved at about 120° C. in 35 cc. of nitrobenzene. After the addition of 3 grams of chlorcyanurdiamide (see "Berichte der Deutschen Chemischen Gesellschaft", vol. 32, page 695) the temperature is maintained for about 3 hours at 150° C. while stirring. After cooling, the solution is mixed with ether, the precipitate which is formed is filtered by suction and boiled with dilute acetic acid; the extract is rendered alkaline by the addition of ammonia. The crude base precipitated thereby can be purified by repeated recrystallization from water and ethanol and is identical with the compounds described in Example 2.

(4) *N₁-N₂-di-(2-methyl-4-aminoquinolyl-6)-chlorcyanurdiamide*

19 grams of 4.6-diaminoquinaldine dissolved in 150 cc. of glacial acetic acid are mixed, while stirring, at water bath temperature with 10 grams of cyanuric chloride. There is obtained a colorless magma which after having been heated for about 2 hours is filtered by suction and washed with hot glacial acetic acid and ether. The colorless fine powder constitutes the dihydrochloride of N₁-N₂-di-(2-methyl-4-aminoquinolyl-6)-chlorcyanurdiamide containing 2 mols of acetic acide in the bound condition which are separated only above 100° C. The compound dissolves in boiling water, concentrated solution gelatinizes on cooling. The salt is also soluble in methanol. It does not melt when being heated up to 300° C. The gelatinous base is insoluble in water, but soluble in ethanol. It does not melt when heated up to 360° C. but gradually darkens at about 300° C. and has the following formula:

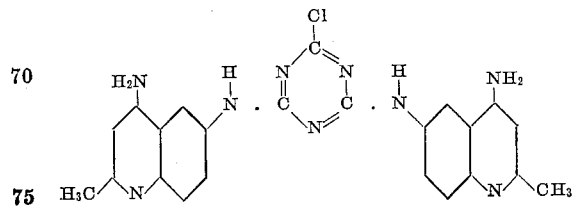

(5) *N₁-N₂-di(2-methyl-4-aminoquinolyl-6)-melamine*

25 grams of the dihydrochloride obtained according to the preceding example are heated for 3 hours to a temperature of between 120° C. and 125° C. together with 125 cc. of alcoholic ammonia. The contents of the bomb are then evaporated to dryness, the residue, apparently a hydrochloride of the above mentioned base, is dissolved in a large quantity of hot water, the solution is filtered so as to obtain it in a clear state, then acidified with hydrochloric acid and mixed hot with a solution of sodium chloride. During this process the hydrochloride of the new base is separated in form of a practically colorless resin which after solidifying is reduced to small pieces, filtered from the liquid by suction, washed with dilute hydrochloric acid and finally with acetone. The yield amounts to 18 grams. The resin dissolves in water to a nearly colorless viscid solution which has a weakly acid reaction and is capable of being readily salted out. The base constitutes a nearly colorless jelly-like mass which can be purified only with difficulty. Its melting point cannot be exactly determined, but the base decomposes at about 245° C. while forming a foaming mass. The base is obtained in two forms; in the one form it is very readily soluble in methanol, in the other form it is soluble therein only with great difficulty. The base may pass from one form into the other. It similarly behaves also towards ethanol. Litmus paper introduced into the aqueous methanol solution of the base assumes a blue color; the aqueous methanol solution of the base shows, however, no alkaline reaction when tested with phenolphthalein. The product has the following formula:

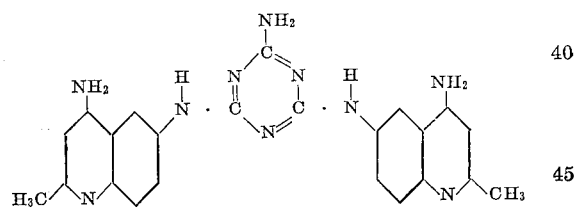

(6) 14 grams of 4.6-diaminoquinaldine dissolved at about 100° C. in 50 cc. of nitrobenzene are mixed, while stirring, with 3.5 grams of aminocyanurdichloride (see "Berichte der Deutschen Chemischen Gesellschaft", vol. 32, page 695). The temperature is then raised to 150° C. and maintained there for a short time. After cooling, the mixture is diluted with a small quantity of ether and the precipitate obtained is filtered by suction. The precipitate is dissolved in hot dilute acetic acid, the solution is acidified by hydrochloric acid and mixed with a solution of sodium chloride. The salt thus obtained is purified by again dissolving it in water, filtering the solution and precipitating it. The properties and behaviour of the compound correspond to those obtained in Example 5.

(7) *Symmetrical cyanuric acid-di-(2-methyl-4-aminoquinolyl-6)-diamide*

300 cc. of 2 normal hydrochloric acid containing 25 grams of the chlorine compound described in Example 4 are boiled for about half an hour in a reflux apparatus. After cooling the dihydrochloride of the above mentioned compound obtained is filtered by suction and washed with acetone. The yield amounts to 20 grams. The product is readily soluble in hot water, the solution is viscid. The colorless base is soluble in an alcoholic aqueous caustic soda solution, it is, however, precipitated again by a large quantity of water. It is soluble in a large quantity of alcohol on boiling for a prolonged time. It decomposes and darkens at about 290° C. and has the following formula:

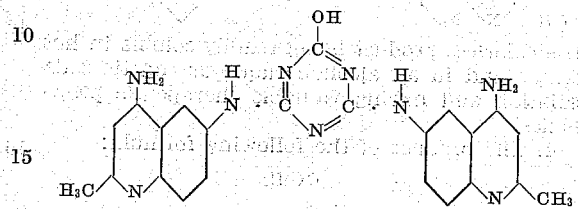

(8) $N_1$-$N_2$-di(2-methyl-4-aminoquinolyl-6)-$N_3$-diethylmelamine 6 grams of the chlorine compound of Example 4 are heated for 3 hours to a temperature of between 120° C. and 125° C. together with 25 cc. of alcohol and 5 grams of diethylamine. The contents of the tube are then evaporated to dryness and the residue extracted with water which has been acidified with a small qantity of hydrochloric acid. A solution of sodium chloride is added to the hot solution and the hydrochloride of the new base separated thereby is filtered by suction and washed with dilute hydrochloric acid and acetone. The hydrochloride is liquefied when heated on the water bath with loss of water and solidifies again to form a grey brittle mass. The yield amounts to 5.5 grams. The product is readily soluble in water. The colorless base precipitated from the solution by means of ammonia can be recrystallized from alcohol. It then melts at 215° C. to 220° C. and has the following formula:

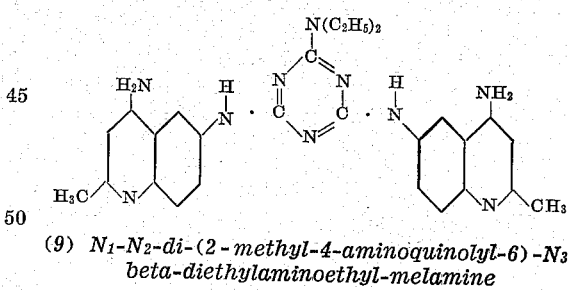

(9) $N_1$-$N_2$-di-(2-methyl-4-aminoquinolyl-6)-$N_3$-beta-diethylaminoethyl-melamine 15 grams of the chlorine compound of Example 4 are heated for 3 hours to 125° C. together with 60 cc. of alcohol and 17 grams of betadiethylaminoethylamine. The contents of the tube are then separated from the main quantity of the alcohol and the remaining jelly-like mass is dissolved in hot water, while adding a small quantity of acetic acid, a clear solution being obtained. The solution is mixed, while stirring, with concentrated caustic soda solution and the colorless base which has separated is filtered by suction and washed with water. It is obtained in a yield of 15.5 grams. The base is dissolved in methanol wherein it is readily soluble, the solution is freed by filtration from the hydroxy-compound of Example 7 which is present in a small quantity, and then acidified with alcoholic hydrochloric acid. After a temporary dissolution the hydrochloride of the new base is separated during this process in form of a very fine powder which, after the addition of ether is filtered by suction. The powder is colorless and readily soluble already in cold water. The solution can be rendered alkaline to litmus paper by the addition of a solution of sodium carbonate without precipitation occurring. The aqueous alcoholic solution of the base shows a distinct alkaline reaction when tested with phenolphthalein. The base is likewise readily soluble in ethanol. It decomposes gradually at about 200° C., while foaming, the decomposition begins already at 170° C. The base has the following formula:

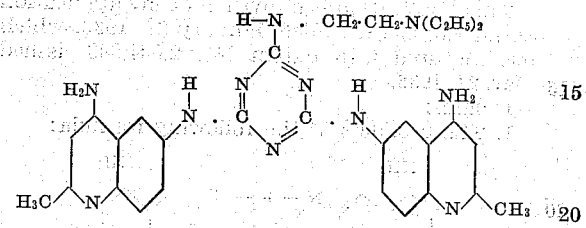

(10) $N_1$-(2-methyl-4-aminoquinolyl-6)-diaminocyanurchloride 17.5 grams of 4.6-diaminoquinaldine are dissolved in 200 cc. of ethanol and the solution is mixed, while stirring, with 16.5 grams of aminocyanurdichloride. The mixture is heated for two hours on the water bath and a colorless crystalline precipitate is obtained which is filtered by suction and washed with ethanol. It constitutes the hydrochloride of the above mentioned base and is obtained in a yield amounting to 31.5 grams. The salt is difficultly soluble in water. The base which may be recrystallized from ethanol shows no visible alteration when being heated up to 300° C. By heating it together with alcoholic ammonia to 120° C., there is obtained 2-methyl-4-aminoquinolyl-6-melamine described in Example 2. On heating the product with 4.6-diaminoquinaldine in an alcoholic solution to 120° C. there is obtained the compound described in Example 5 in a very good yield. It has the following formula:

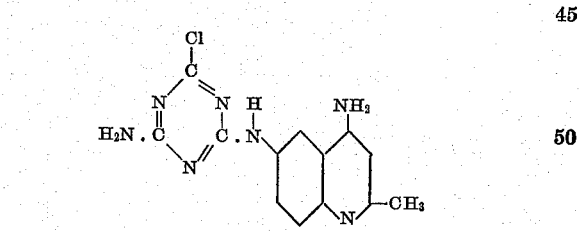

(11) Di-(2-methyl-4-aminoquinolyl-6-amino)-cyanuric acid ethyl ester 11.5 grams of the dihydrochloride described in Example 4 which has been dried at 110° C. in the vacuum are introduced into a solution of 1.4 grams of sodium in 70 cc. of absolute alcohol. The mixture is boiled for 3 hours in a reflux apparatus and a colorless magma is obtained which is poured into ice water. The colorless base of the above mentioned composition is filtered by suction and washed with water. The yield amounts to about 9 grams. The base is readily soluble in alcohol and separates, after having been allowed to stand for a prolonged time, having become sparingly soluble in alcohol. It begins to sinter at about 200° C. and is transformed into a foaming mass at 235° C. When being further heated, the mass becomes a fine red. The hydrochloride is rather readily soluble in water. The base has the following formula:

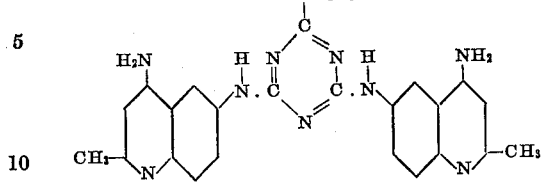

This application is a division of my application Serial No. 653,192, filed January 23, 1933, which has matured into Patent No. 2,034,983, issued Mar. 24, 1936.

I claim:

1. The products of the following formula:

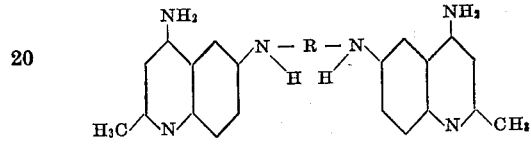

in which R stands for a cyanuric acid radical, said products showing valuable therapeutic properties.

2. The product of the following formula:

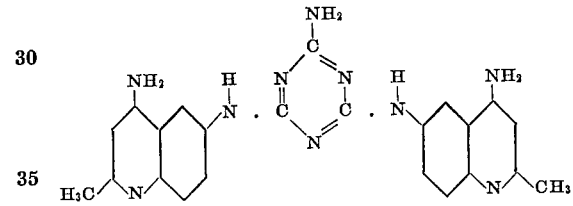

being a colorless jelly-like mass showing no distinct melting point and having valuable therapeutic properties.

3. The product of the following formula:

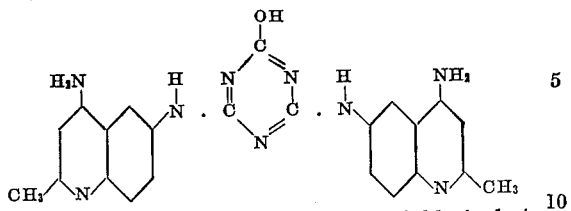

the colorless product being readily soluble in hot water and in an alcoholic aqueous caustic soda solution and having valuable therapeutic properties.

4. The product of the following formula:

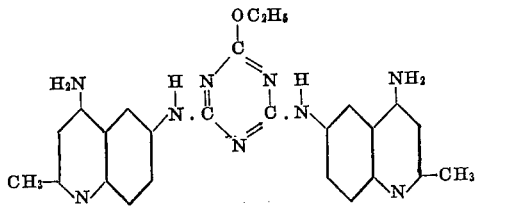

being readily soluble in alcohol, beginning to sinter at about 200° C., its hydrochloride being rather readily soluble in water, the product having valuable therapeutic properties.

5. The products of the following formula:

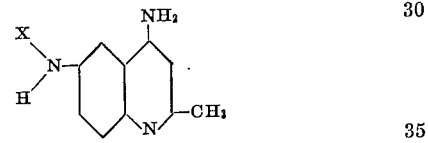

in which X stands for a cyanuric acid radical, said products showing valuable therapeutic properties.

HEINRICH JENSCH.